US012581504B2

(12) United States Patent
Deghel et al.

(10) Patent No.: US 12,581,504 B2
(45) Date of Patent: Mar. 17, 2026

(54) DYNAMIC SWITCHING BETWEEN MULTI-TRANSMISSION RECEPTION POINT AND SINGLE-TRANSMISSION RECEPTION POINT

(71) Applicant: Nokia Technologies Oy, Espoo (FI)

(72) Inventors: Matha Deghel, Massy (FR); Keeth Saliya Jayasinghe Laddu, Espoo (FI); Youngsoo Yuk, Seoul (KR)

(73) Assignee: Nokia Technologies Oy, Espoo (FI)

( * ) Notice: Subject to any disclaimer, the term of this patent is extended or adjusted under 35 U.S.C. 154(b) by 266 days.

(21) Appl. No.: 18/257,054

(22) PCT Filed: Dec. 16, 2021

(86) PCT No.: PCT/IB2021/061859
§ 371 (c)(1),
(2) Date: Jun. 12, 2023

(87) PCT Pub. No.: WO2022/153113
PCT Pub. Date: Jul. 21, 2022

(65) Prior Publication Data
US 2024/0057112 A1      Feb. 15, 2024

Related U.S. Application Data

(60) Provisional application No. 63/138,132, filed on Jan. 15, 2021.

(51) Int. Cl.
*H04W 72/232* (2023.01)
*H04L 5/00* (2006.01)

(52) U.S. Cl.
CPC ......... *H04W 72/232* (2023.01); *H04L 5/0035* (2013.01); *H04L 5/0048* (2013.01)

(58) Field of Classification Search
CPC .. H04W 72/232; H04L 5/0035; H04L 5/0048; H04L 5/001; H04L 5/0051; H04L 5/0053; H04L 5/0094; Y02D 30/70
See application file for complete search history.

(56) References Cited

U.S. PATENT DOCUMENTS

2020/0267748 A1* 8/2020 Khoshnevisan ...... H04L 1/0013
2020/0351841 A1 11/2020 Cirik et al.
(Continued)

FOREIGN PATENT DOCUMENTS

WO       2021/209979 A1    10/2021
WO       2022/029979 A1    2/2022

OTHER PUBLICATIONS

Office action received for corresponding European Patent Application No. 21830518.3, dated Dec. 11, 2024, 11 pages.
(Continued)

*Primary Examiner* — Robert C Scheibel
(74) *Attorney, Agent, or Firm* — McCarter & English, LLP

(57) ABSTRACT

Systems, methods, apparatuses, and computer program products for enabling dynamic switching between multi-transmission reception point (multi-TRP) and single-transmission reception point (single-TRP). A method may include receiving a first indication in a downlink control information or a medium access control control element. The method may further include determining, at a user equipment, whether to apply a multi-transmission reception point physical uplink shared channel scheme or a single-transmission reception point physical uplink shared channel scheme for transmitting a transport block based on the first indication. In addition, the method may include interpreting at least one downlink control information field differently depending on whether it is determined that the single-transmission reception point physical uplink shared channel
(Continued)

scheme or the multi-transmission reception point physical uplink shared channel scheme is applicable.

12 Claims, 4 Drawing Sheets

(56) References Cited

U.S. PATENT DOCUMENTS

| | | | | |
|---|---|---|---|---|
| 2022/0132526 A1* | 4/2022 | Nam | H04L 5/0094 | |
| 2022/0217644 A1* | 7/2022 | Kung | H04W 52/365 | |
| 2022/0217653 A1* | 7/2022 | Kung | H04W 52/367 | |
| 2023/0012515 A1* | 1/2023 | Jiang | H04L 5/0051 | |
| 2023/0300833 A1* | 9/2023 | Zhang | H04L 5/0044 | |
| | | | | 370/329 |
| 2023/0328726 A1* | 10/2023 | Shi | H04L 5/0094 | |
| | | | | 370/329 |
| 2024/0015732 A1* | 1/2024 | Muruganathan | H04W 72/1268 | |
| 2024/0015753 A1* | 1/2024 | Matsumura | H04L 5/0053 | |

OTHER PUBLICATIONS

"3rd Generation Partnership Project; Technical Specification Group Radio Access Network; NR; Physical layer procedures for control (Release 16)", 3GPP TS 38.213, V16.3.0, Sep. 2020, pp. 1-179.

"New WID: Further enhancements on MIMO for NR", 3GPP TSG RAN Meeting #86, RP-193133, Agenda: 9.1.1, Samsung, Dec. 9-12, 2019, 5 pages.

International Search Report and Written Opinion received for corresponding Patent Cooperation Treaty Application No. PCT/IB2021/061859, dated Mar. 25, 2022, 18 pages.

"Enhancements for Multi-TRP URLLC schemes", 3GPP TSG RAN WG1 #104-bis-e Meeting, R1-2103366, Agenda: 8.1.2.1, Nokia, Apr. 12-20, 2021, 32 pages.

"Enhancements on Multi-TRP for PDCCH, PUCCH and PUSCH", 3GPP TSG RAN WG1 #104-e, R1-2100422, Agenda: 8.1.2.1, vivo, Jan. 25-Feb. 5, 2021, 28 pages.

Vietnam Office Action and English Translation, dated Jul. 8, 2025 (4 pages).

English Translation of Chinese Office Action, dated Jul. 22, 2025 (4 pages).

* cited by examiner

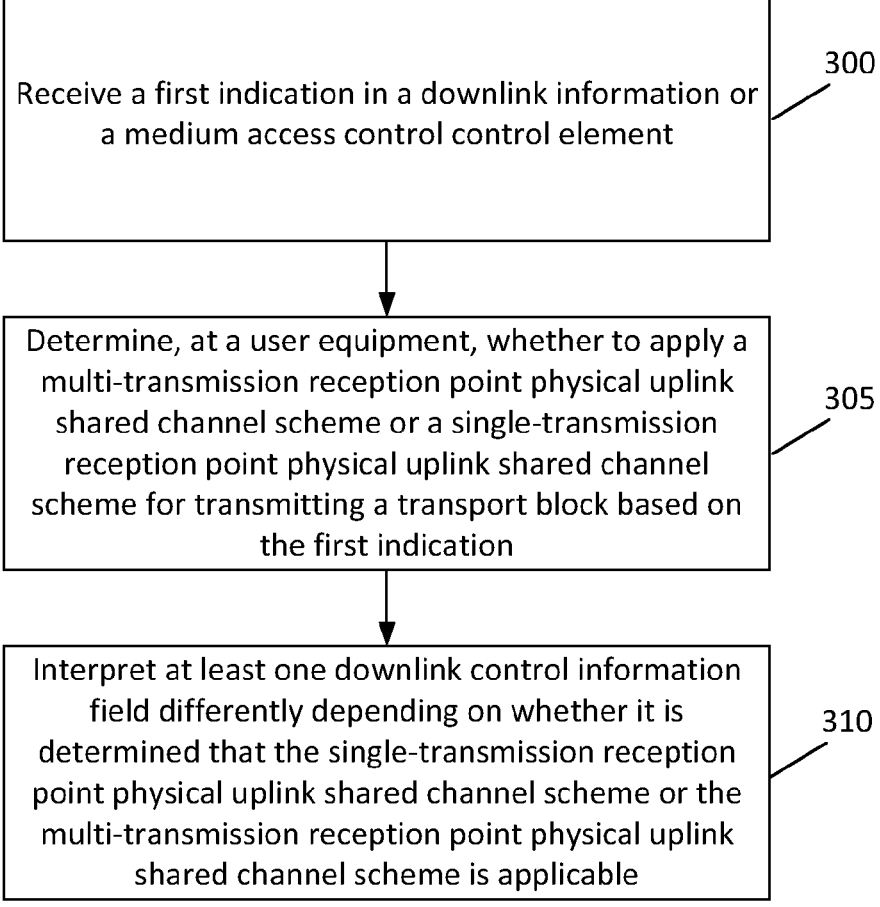

Receive a first indication in a downlink information or a medium access control control element

300

Determine, at a user equipment, whether to apply a multi-transmission reception point physical uplink shared channel scheme or a single-transmission reception point physical uplink shared channel scheme for transmitting a transport block based on the first indication

305

Interpret at least one downlink control information field differently depending on whether it is determined that the single-transmission reception point physical uplink shared channel scheme or the multi-transmission reception point physical uplink shared channel scheme is applicable

DYNAMIC SWITCHING BETWEEN MULTI-TRANSMISSION RECEPTION POINT AND SINGLE-TRANSMISSION RECEPTION POINT

RELATED APPLICATION

This application claims priority to PCT Application No. PCT/IB2021/061859 filed Dec. 16, 2021, which claims priority benefit from U.S. application 63/138,132 filed Jan. 15, 2021, which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for enabling dynamic switching between multi-transmission reception point and single-transmission reception point.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments may be directed to a method. The method may include receiving a first indication in a downlink control information or a medium access control control element. The method may further include determining, at a user equipment, whether to apply a multi-transmission reception point physical uplink shared channel scheme or a single-transmission reception point physical uplink shared channel scheme for transmitting a transport block based on the first indication. In addition, the method may include interpreting at least one downlink control information field differently depending on whether it is determined that the single-transmission reception point physical uplink shared channel scheme or the multi-transmission reception point physical uplink shared channel scheme is applicable.

Other example embodiments may be directed to an apparatus. The apparatus may include at least one processor and at least one memory including computer program code. The at least one memory and computer program code may also be configured to, with the at least one processor, cause the apparatus at least to receive a first indication in a downlink control information or a medium access control control element. The apparatus may further be caused to determine whether to apply a multi-transmission reception point physical uplink shared channel scheme or a single-transmission reception point physical uplink shared channel scheme for transmitting a transport block based on the first indication. In addition, the apparatus may be caused to interpret at least one downlink control information field differently depending on whether it is determined that the single-transmission reception point physical uplink shared channel scheme or the multi-transmission reception point physical uplink shared channel scheme is applicable.

Other example embodiments may be directed to an apparatus. The apparatus may include means for receiving a first indication in a downlink control information or a medium access control control element. The apparatus may further include means for determining whether to apply a multi-transmission reception point physical uplink shared channel scheme or a single-transmission reception point physical uplink shared channel scheme for transmitting a transport block based on the first indication. In addition, the apparatus may include means for interpreting at least one downlink control information field differently depending on whether it is determined that the single-transmission reception point physical uplink shared channel scheme or the multi-transmission reception point physical uplink shared channel scheme is applicable.

In accordance with other example embodiments, a non-transitory computer readable medium may be encoded with instructions that may, when executed in hardware, perform a method. The method may include receiving a first indication in a downlink control information or a medium access control control element. The method may further include determining whether to apply a multi-transmission reception point physical uplink shared channel scheme or a single-transmission reception point physical uplink shared channel scheme for transmitting a transport block based on the first indication. In addition, the method may include interpreting at least one downlink control information field differently depending on whether it is determined that the single-transmission reception point physical uplink shared channel scheme or the multi-transmission reception point physical uplink shared channel scheme is applicable.

Other example embodiments may be directed to a computer program product that performs a method. The method may include receiving a first indication in a downlink control information or a medium access control control element. The method may further include determining, at a user equipment, whether to apply a multi-transmission reception point physical uplink shared channel scheme or a single-transmission reception point physical uplink shared channel scheme for transmitting a transport block based on the first indication. In addition, the method may include interpreting at least one downlink control information field differently depending on whether it is determined that the single-transmission reception point physical uplink shared channel scheme or the multi-transmission reception point physical uplink shared channel scheme is applicable.

Other example embodiments may be directed to an apparatus that may include circuitry configured to receive a first indication in a downlink control information or a medium access control control element. The apparatus may further include circuitry configured to determine whether to apply a multi-transmission reception point physical uplink shared channel scheme or a single-transmission reception point physical uplink shared channel scheme for transmitting a transport block based on the first indication. In addition, the apparatus may include circuitry configured to interpret at least one downlink control information field differently depending on whether it is determined that the single-transmission reception point physical uplink shared channel scheme or the multi-transmission reception point physical uplink shared channel scheme is applicable.

BRIEF DESCRIPTION OF THE DRAWINGS

For proper understanding of example embodiments, reference should be made to the accompanying drawings, wherein:

FIG. 3 illustrates a flow diagram of a method, according to certain example embodiments.

FIG. 4(*b*) illustrates another apparatus, according to certain example embodiments.

DETAILED DESCRIPTION

Figure 1:
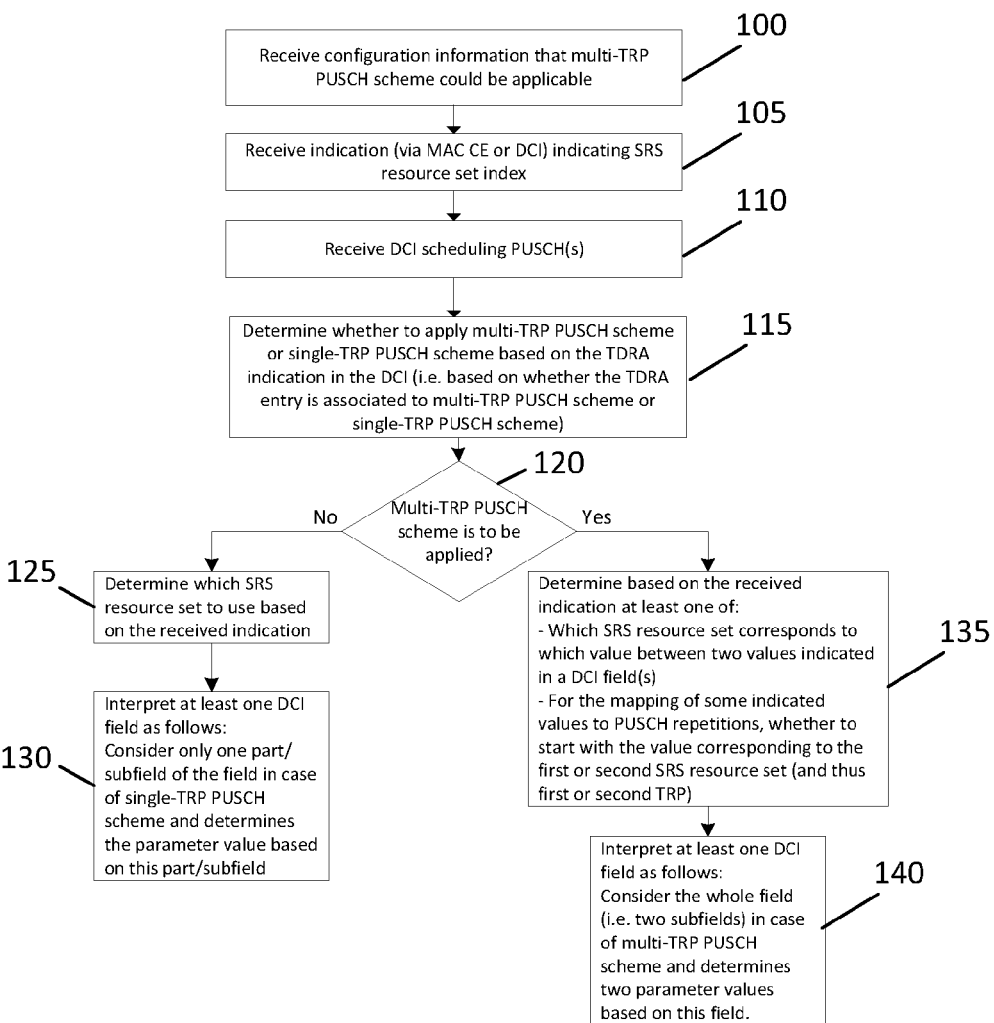
FIG. 1 illustrates an example of a user equipment (UE) flow diagram, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for enabling dynamic switching between multi-transmission reception point (multi-TRP) and single-transmission reception point (single-TRP).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

In physical uplink shared channel (PUSCH) multi-antenna precoding modes, a user equipment (UE) may be configured in two different modes. For example, the UE may be configured in codebook-based transmission or non-codebook-based transmission. For the codebook-based dynamic grant (DG) PUSCH, the UE may determine a sounding reference signal (SRS) resource indicator (SRI) and transmit precoding-matrix indicator (TPMI) information (via precoding information and number of layers) from the corresponding fields in the downlink control information (DCI). The SRI may provide the uplink (UL) beam information, and the TPMI may provide the UL precoder information.

For non-codebook-based DG PUSCH, the UE may determine its precoder and transmission rank based on DL measurements. However, the UE selection of a precoder (and the number of layers) for each scheduled PUSCH may be modified by the network (in case multiple SRS resources are configured) by omitting some columns from the precoder that the UE has selected. This latter step may be performed by indicating, via SRI contained in DCI scheduling the PUSCH, a subset of the configured SRS resources.

Under PUSCH power control, the UE may determine the PUSCH transmission power based on the procedure described in $3^{rd}$ Generation Partnership Project (3GPP) TS 38.213. For example, the UE may indicate/determine closed-loop parameters (e.g., closed loop index, transmit power control (TPC) command) and open-loop parameters (e.g., pathloss reference RS, p0, alpha). Further, the TPC command(s) may be carried within UL grant scheduling the PUSCH. In addition, the TPC command, and the corresponding closed-loop index may be jointly carried to multiple UEs by means of group-common DCI.

3GPP may support PUSCH repetition Type A where the PUSCH repetition via slot aggregation may be supported in a semi-static way, i.e. there is no repetition within a slot, with an aggregation factor of 2, 4, or 8. This repetition operation may also be referred to as slot-based repetition.

3GPP may also support PUSCH repetition Type B where motivations for PUSCH enhancements is to allow one allocation cross-slot-boundary and cross-DL-symbols scheduling for reduced latency without sacrificing reliability (this is also known as multi-segment transmission). Additionally, specification of PUSCH enhancements for both dynamic-grant based PUSCH and configured-grant based PUSCH may be provided. For example, for a transport block, one dynamic UL grant or one configured grant may schedule two or more PUSCH repetitions that can be in one slot, or across slot boundaries in consecutive available slots.

In certain cases, one nominal repetition may be segmented into one or more actual repetitions around semi-static DL symbols, and dynamically indicated/semi-statically configured invalid UL symbols and/or at the slot boundary. For instance, for a dynamic grant, the actual repetitions may be transmitted. In addition, there may not be any conflict between the transmitted symbols and the dynamic DL/flexible symbols indicated by dynamic slot format indication/indicator (SFI). Further, for a configured grant, whether the actual repetition is transmitted or not may follow the Rel-15 principle. For example, the actual repetition is not transmitted if it conflicts with any dynamic downlink (DL)/flexible symbols. In addition, it is not transmitted if it conflicts with any semi-static flexible symbols if dynamic SFI is configured but not received.

Certain PUSCH enhancements may be available for multi-TRP. In this regard, various agreements have been made in 3GPP Release-17 supporting multi-TRP PUSCH transmission/repetition schemes. For example, for single DCI based M-TRP PUSCH reliability enhancement, support may be provided for the TDMed (time division multiplexed) PUSCH repetition scheme(s) based on PUSCH Type A and Type B. In some multi-TRP PUSCH scheme(s), the (substantially) same TB (transport block) may be transmitted/repeated in a time-division-multiplexed (TDM) manner using two different uplink beams (or equivalently, spatial relation infos, or uplink transmission configuration indicator 5                                                                                      6

(TCI) states, or SRIs) essentially towards different transmission reception points (TRP). In addition, for single DCI based M-TRP PUSCH repetition schemes, support for codebook based PUSCH transmission may be provided with certain enhancements. For instance, there may be support for the indication of two SRIs (where each SRI may correspond to an uplink beam), and support for the indication of two TPMIs. In supporting the two SRIs, the bit field of the SRI may be enhanced, and no changes may be made on the SRI field. In supporting the two TPMIs, the same number of layers may be applied for both TPMIs if two TPMIs are indicated. Further, the number of SRS ports between two TRPs may be the same, and details for indicating two TPMIs (e.g., one TPMI field or two TPMI fields) may be provided. In certain cases, the maximum number of SRS resource sets may be increased to two, and configuration details of each SRS resource set (e.g., number of SRS resources in a resource set) may be provided. It is noted that the single-TRP PUSCH scheme (where PUSCH repetitions are transmitted using the same uplink beam towards the same TRP) is the default scheme if the multi-TRP PUSCH scheme is not configured (to be applicable in some cases).

Under multi-TRP PUSCH related power control enhancements, for each TRP closed-loop power control for PUSCH, certain alternatives may be available when the "closedLoopindex" values are different. For example, in a first option, a single TPC field may be used in DCI formats 0_1/0_2, and the TPC value applied for both PUSCH beams. In a second option, a single TPC field may be used in DCI formats 0_1/0_2, and the TPC value applied for one of two PUSCH beams at a slot. In a third option, a second TPC field may be added in DCI formats 0_1/0_2. In a fourth option, a single TPC field may be used in DCI formats 0_1/0_2, and this field may indicate two TPC values applied to two PUSCH beams, respectively.

As noted herein, certain multi-TRP PUSCH transmission/repetition schemes have been defined. However, there may be certain challenges related to the support of single/multi-TRP switching. For instance, for critical services such as ultra-reliable low-latency communications (URLLC), it may be beneficial to use multi-TRP PUSCH schemes to guarantee reliability/robustness by relying on beam diversity. For example, it may be possible to repeat the same transport block (TB) towards multiple TRPs such that the network can overcome blockage scenarios. However, in certain instances of time and/or for less critical services, the network may desire to receive some TB s toward the same TRP. To allow such flexibility, support of dynamic switching between different repetition modes (or transmission modes) may be needed.

Once an operating mode (e.g., multi-TRP vs single-TRP) is determined, it is also open how to determine some parameter(s) value(s) for which the indication/interpretation may be different depending on whether the single-TRP PUSCH scheme or multi-TRP PUSCH scheme is used. In addition, mapping/association should be defined between some parameter(s) value(s) indicated via DCI and the configured SRS resource sets (and thus TRPs) and/or event he PUSCH repetitions. Currently, there is not a solution for enabling a UE to determine whether to apply a multi-TRP PUSCH scheme or a single-TRP PUSCH scheme. There is also not a solution on how to enable the UE for at least one DCI field to determine/interpret corresponding parameter value(s) differently depending on the applicable PUSCH scheme, and for enabling the UE to determine the association between some parameter(s) value(s) indicated via DCI and the configured SRS resource sets and/or the PUSCH repetitions.

In view of the above challenges, certain example embodiments may provide the ability to enable the UE to determine whether to apply the multi-TRP PUSCH scheme or the single-TRP PUSCH scheme. Certain example embodiments may also provide, for at least one (corresponding) DCI field, a way to determine/interpret corresponding parameter value(s) depending on the applicable PUSCH scheme. Additional example embodiments may enable the UE to determine the association between some parameter(s) value(s) indicated via DCI and the configured SRS resource sets and/or the PUSCH repetitions.

According to certain example embodiments, multiple alternatives may be available for the UE to determine whether to apply the multi-TRP PUSCH scheme or the single-TRP PUSCH scheme. Certain example embodiments may also provide a way for the UE to determine the association or mapping between one or more parameter(s) value(s) indicated via DCI and the configured SRS resource sets (and thus TRP) and/or the PUSCH repetitions, depending on the applicable PUSCH scheme. Further example embodiments may provide one or more ways for the UE to determine, for at least one DCI field, corresponding parameter value(s) differently depending on the applicable PUSCH scheme.

According to certain example embodiments, the UE may determine the mode of operation from a multi-TRP PUSCH scheme or a single-TRP PUSCH scheme based on several factors. For example, the UE may make the determination based on a time domain resource assignment (TDRA) entry associated with (via radio resource control (RRC) or medium access control (MAC) control element (CE)) either single-TRP PUSCH scheme or multi-TRP PUSCH scheme. Thus, when the TDRA entry is indicated in DCI, the UE may know which scheme to apply. In certain example embodiments, if a TDRA entry is not associated with a scheme (e.g., single or multi-TRP), then a default scheme may be defined/considered. For example, a single-TRP PUSCH scheme may serve as the default scheme to use.

In other example embodiments, in cases where a separate SRI subfield/field is used for an SRI indication per TRP and assuming that there is (at least) one SRI entry that is configured as reserved (or invalid): if at least one of the SRI subfields/fields indicates a reserved entry, the UE may apply the single-TRP PUSCH scheme; otherwise, if both subfields/fields indicate valid entries (i.e., not reserved), then the multi-TRP PUSCH scheme may be applied. It is noted that the terms 'subfield' and 'field' may be used interchangeably, at least in some cases. According to other example embodiments, alternatively or additionally, this operation may be used for the "precoding information and number of layers" field, which includes TPMI, in case of the codebook-based UL mode.

In some example embodiments, in cases where a SRI field is used for joint SRI indication for both TRPs (e.g., to indicate different combinations of SRS resources including, for example more than one SRS resource at a time), some of the SRI combinations/entries (i.e., indications) may be configured to be used for the single-TRP PUSCH scheme. For example, some of the SRI combinations/entries may be configured to be used for the single-TRP PUSCH scheme if the combination points to SRS resource(s) in one of the SRS resource sets. And the other SRI combinations may be configured to be used for the multi-TRP PUSCH scheme if, for example, the combination points to the SRS resources belonging to different SRS resource sets. Thus, when receiving the SRI indication, the UE may know whether to apply the single-TRP or the multi-TRP scheme. Alternative or additionally, in other example embodiments, the above operation may be used for the "precoding information and number of layers" field, which may include the TPMI when operating under the codebook-based UL mode.

According to certain example embodiments, the UE may be able to determine the mode of operation from the multi-TRP PUSCH scheme or the single-TRP PUSCH scheme based on a dedicated field in the DCI. For instance, the dedicated field in the DCI may be used to indicate whether to apply the single-TRP scheme or the multi-TRP scheme. In certain example embodiments, if two SRS resource sets are configured, and each set is associated with a TRP, the dedicated field may then be interpreted as the number of SRS resource sets (e.g., 1 or 2) to use.

According to other example embodiments, the UE may be able to determine the mode of operation from the multi-TRP PUSCH scheme or the single-TRP PUSCH scheme based on a new MAC CE indication. That is, the MAC CE indication may be used to indicate whether to apply the single-TRP scheme or the multi-TRP scheme.

According to further example embodiments, the UE may be able to determine the mode of operation from the multi-TRP PUSCH scheme or the single-TRP PUSCH scheme by providing the UE with one or more dedicated radio network temporary identifiers (RNTIs). For example, the dedicated RNTIs may indicate whether to apply the multi-TRP PUSCH scheme or the single-TRP PUSCH scheme. According to other example embodiments, in addition to the current RNTI(s) which could be used to indicate that the single-TRP scheme should be applied, a dedicated RNTI(s) may be used to indicate whether the multi-TRP scheme should be applied.

As discussed above, certain example embodiments may provide ways/alternatives to determine whether to apply the multi-TRP PUSCH scheme or the single-TRP PUSCH scheme. Other example embodiments may provide an operation/way to determine/define the mapping/association between some parameter(s) value(s) indicated via the DCI and the configured SRS resource sets or even the PUSCH repetitions, assuming that each SRS resource set is associated with a TRP.

For instance, according to certain example embodiments, the MAC CE (or DCI) indication may be used to indicate the SRS resource set index/ID (e.g., 0 or 1). This indication may be used to indicate which SRS resource set the UE may use when the single-TRP PUSCH scheme is applied. In other example embodiments, this indication may be used to indicate which SRS resource set to start with (i.e., it may indicate the order of SRS resource sets) when the multi-TRP PUSCH scheme is applied. Specifically, the indicated SRS resource set index may allow the UE to determine whether the first value of a certain DCI field (such as TPC command, SRI, "precoding information and number of layers," and PTRS-DMRS association) corresponds to the first SRS resource set or the second SRS resource set. In addition, for the multi-TRP PUSCH scheme, for the mapping of some of the indicated value(s) to PUSCH repetitions, this indication may be used to indicate whether to start with the value(s) corresponding to the first or the second SRS resource set and, thus, potentially the first or the second TRP.

According to certain example embodiments, for the ways/alternatives described above for determining whether to apply the multi-TRP PUSCH scheme or the single-TRP PUSCH scheme, the UE may interpret at least one DCI field (if this field is indicating an applicable value(s)) having the same size regardless of which scheme is applicable. This may be accomplished in various ways, for example, in certain example embodiments, the UE may consider one part/subfield of the field in case of the single-TRP PUSCH scheme, and determine the parameter value based on this part/subfield. The UE may also consider the whole field (i.e., two subfields) in the case of the multi-TRP PUSCH scheme, and determine two parameter values based on this field. For instance, the above may be applied when the TPC field includes two TPC subfields, each of which may contain a TPC command value. A similar approach may also be applied for SRI, "precoding information and number of layers" (including TPMI), and/or PTRS-DMRS association fields. In certain example embodiments, an SRI value may point to more than one SRS resource (e.g., in case of non-codebook-based mode).

According to other example embodiments, in case the at least one field is used as a codepoint pointing to two parameter values indicated via MAC CE (or RRC), the UE may interpret at least one DCI field having the same size regardless of which scheme is applicable as follows: The UE may determine one parameter value (first or second) from the two values indicated via MAC CE (or RRC) in the case of the single-TRP scheme; and the UE may determine/use the two values in case of the multi-TRP PUSCH scheme. For example, the above may be applied when the TPC field in DCI is used as a codepoint associated, for example, via MAC CE, to two TPC command values. In addition, a similar approach may be applied for SRI, "precoding information and number of layers", and/or PTRS-DMRS association fields.

FIG. 1 illustrates an example of a UE flow diagram, according to certain example embodiments. As illustrated in FIG. 1, at 100, the UE may receive configuration information that the multi-TRP PUSCH scheme could be applicable. For instance, in certain example embodiments, the configuration information, indication, and DCI scheduling PUSCH may be received from the network (e.g., gNB). At 105, the UE may receive an indication (via MAC CE or DCI) indicating an SRS resource set index. At 110, the UE may receive DCI scheduling PUSCH(s). At 115, the UE may determine whether to apply the multi-TRP PUSCH scheme or the single-TRP PUSCH scheme based on the TDRA indication in the DCI (i.e., based on whether the TDRA entry is associated with the multi-TRP PUSCH scheme or the single-TRP PUSCH scheme). At 120, the UE check whether to apply the multi-TRP PUSCH scheme based on the determination at 115. If the multi-TRP PUSCH scheme is not to be applied (i.e. single-TRP PUSCH scheme should be applied then), then, at 125, the UE may determine which SRS resource set to use based on the received indication. At 130, the UE may interpret at least one DCI field by considering one part/subfield of the field in case of single-TRP PUSCH scheme, and determining the parameter value based on this part/subfield. However, if it is determined at 120 that the multi-TRP PUSCH scheme is to be applied, then at 135, the UE may determine at least one of the following based on the received indication. For example, the UE may determine which SRS resource set corresponds to which value between two values indicated in a DCI field(s). The UE may also, for the mapping of some indicated values to PUSCH repetitions, determine whether to start the value corresponding to the first or second SRS resource set (and thus first or second TRP). At 140, the UE may interpret at least one DCI field by considering the whole field (i.e., two subfields) in case of the multi-TRP PUSCH scheme, and determine two parameter values based on this field.

Figure 2:
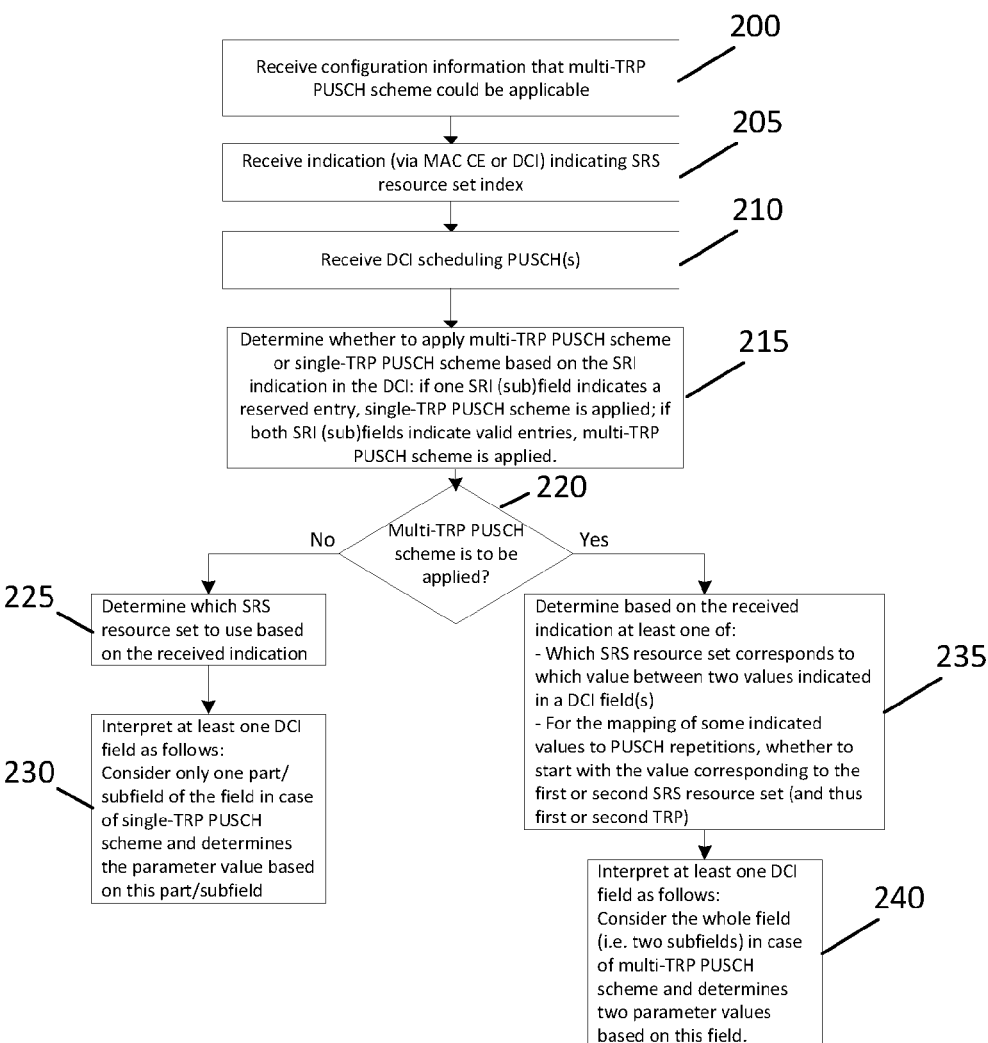
FIG. 2 illustrates an example of another UE flow diagram, according to certain example embodiments.

FIG. 2 illustrates an example of another UE flow diagram, according to certain example embodiments. In particular, FIG. 2 illustrates a UE flow diagram for a case where a separate SRI field (or subfield) may be used for SRI indication per TRP. For instance, at 200, the UE may receive configuration information that the multi-TRP PUSCH scheme could be applicable. At 205, the UE may receive an indication (via MAC CE or DCI) indicating an SRS resource set index. At 210, the UE may receive DCI scheduling PUSCH(s). At 215, the UE may determine whether to apply the multi-TRP PUSCH scheme or the single-TRP PUSCH scheme based on the SRI indication in the DCI. In certain example embodiments, if one SRI (sub)field indicates a reserved entry, then the single-TRP PUSCH scheme may be applied. However, if both SRI (sub)fields indicate valid entries, the multi-TRP PUSCH scheme may be applied.

At 220, the UE check whether the multi-TRP PUSCH scheme should be applied based on the determination at 215. If the multi-TRP PUSCH scheme is to not be applied (i.e. single-TRP PUSCH scheme should be applied then), then at 225, the UE may determine which SRS resource set to use based on the received indication. At 230, the UE may interpret at least one DCI field by considering one part/subfield of the field in case of single-TRP PUSCH scheme, and determining the parameter value based on this part/subfield. However, if it is determined at 220 that the multi-TRP PUSCH scheme is to be applied, then at 235, the UE may determine at least one of the following based on the received indication. For example, the UE may determine which SRS resource set corresponds to which value between two values indicated in a DCI field(s). The UE may also, for the mapping of some indicated values to PUSCH repetitions, determine whether to start with the value corresponding to the first or the second SRS resource set (and thus the first or second TRP). At 240, the UE may interpret at least one DCI field by considering the whole field (i.e., two subfields) in case of multi-TRP PUSCH scheme, and determine two parameter values based on this field.

FIG. 3 illustrates a flow diagram of a method, according to certain example embodiments. In certain example embodiments, the flow diagram of FIG. 3 may be performed by a network entity or network node in a 3GPP system, such as LTE or 5G-NR. For instance, in an example embodiment, the method of FIG. 3 may be performed by a UE, for instance similar to apparatuses 10 or 20 illustrated in FIGS. 4(*a*) and 4(*b*).

According to certain example embodiments, the method of FIG. 3 may include, at 300, receiving a first indication in a downlink control information or a medium access control control element. The method may further include, at 305, determining, at a user equipment, whether to apply a multi-transmission reception point physical uplink shared channel scheme or a single-transmission reception point physical uplink shared channel scheme for transmitting a transport block. In addition, the method may include, at 310, interpreting at least one downlink control information field differently depending on whether it is determined that the single-transmission reception point physical uplink shared channel scheme or the multi-transmission reception point physical uplink shared channel scheme is applicable.

According to certain example embodiments, the method may further include receiving a second indication indicating a sounding reference signal resource set index. According to other example embodiments, the second indication indicating the sounding reference signal resource set index may be received via the medium access control control element or the downlink control information. According to further example embodiments, when the single-transmission reception point physical uplink shared channel scheme is applicable, the method may further include determining which sounding reference signal resource set to use based on the received second indication indicating the sounding reference signal resource set index.

In certain example embodiments, when the single-transmission reception point physical uplink shared channel scheme is applicable, the at least one downlink control information field may be interpreted by at least one of considering a subfield of the downlink control information field, and determining a parameter value based on the subfield of the downlink control information field. In some example embodiments, when the multi-transmission reception point physical uplink shared channel scheme is applicable, the method may further include determining, based on the received second indication indicating the sounding reference signal resource set index, at least one of which sounding reference signal resource set corresponds to which value between two values indicated in a downlink control information field, and for mapping indicated values to physical uplink shared channel repetitions, whether to start with a value corresponding to a first or a second sounding reference signal resource set.

In other example embodiments, when the multi-transmission reception point physical uplink shared channel scheme is applicable, the at least one downlink control information field may be interpreted by at least one of considering the whole downlink control information field, and determining two parameter values based on the whole downlink control information field. According to certain example embodiments, the first indication in the downlink control information may be a time domain resource assignment. According to other example embodiments, the time domain resource assignment may be associated with the single-transmission reception point physical uplink shared channel scheme or the multi-transmission reception point physical uplink shared channel scheme. According to further example embodiments, the first indication in the downlink control information may be a sounding reference signal resource indicator.

In certain example embodiments, when at least one field of the sounding reference signal resource indicator indicates a reserved entry, the single-transmission reception point physical uplink shared channel scheme may be applied. In some example embodiments, when each of two fields of the sounding reference signal resource indicator indicates a valid entry, the multi-transmission reception point physical uplink shared channel scheme may be applied. In other example embodiments, the method may also include receiving downlink control information scheduling a physical uplink shared channel.

FIG. 4(*a*) illustrates an apparatus 10 according to certain example embodiments. In certain example embodiments, apparatus 10 may be a node or element in a communications network or associated with such a network, such as a UE, mobile equipment (ME), mobile station, mobile device, stationary device, IoT device, or other device. In other example embodiments, apparatus 10 may be a network element, node, host, server in a communication network or serving such a network. It should be noted that one of ordinary skill in the art would understand that apparatus 10 may include components or features not shown in FIG. 4(*a*)

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 4(a).

Figure 4A:
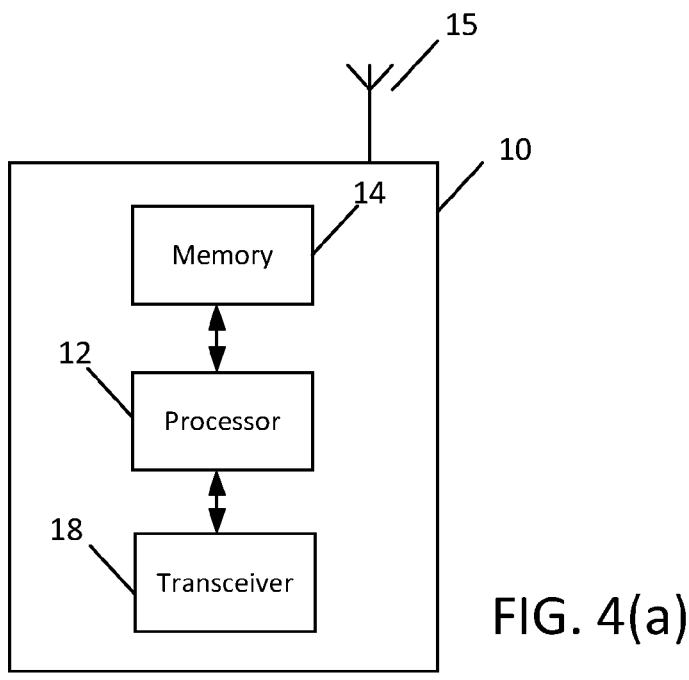
FIG. 4(*a*) illustrates an apparatus, according to certain example embodiments.

As illustrated in the example of FIG. 4(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4(a), multiple processors may be utilized according to other example embodiments. For example, it should be understood that, in certain example embodiments, apparatus may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-3.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-3.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to receive a first indication in a downlink control information or a medium access control control element. Apparatus 10 may further be controlled by memory 14 and processor 12 to determine whether to apply a multi-transmission reception point physical uplink shared channel scheme or a single-transmission reception point physical uplink shared channel scheme for transmitting a transport block based on the first indication. In addition, apparatus 10 may be controlled by memory 14 and processor 12 to interpret at least one downlink control information field differently depending on whether it is determined that the applicable single-transmission reception point physical uplink shared channel scheme or the multi-transmission reception point physical uplink shared channel scheme.

Figure 4B:
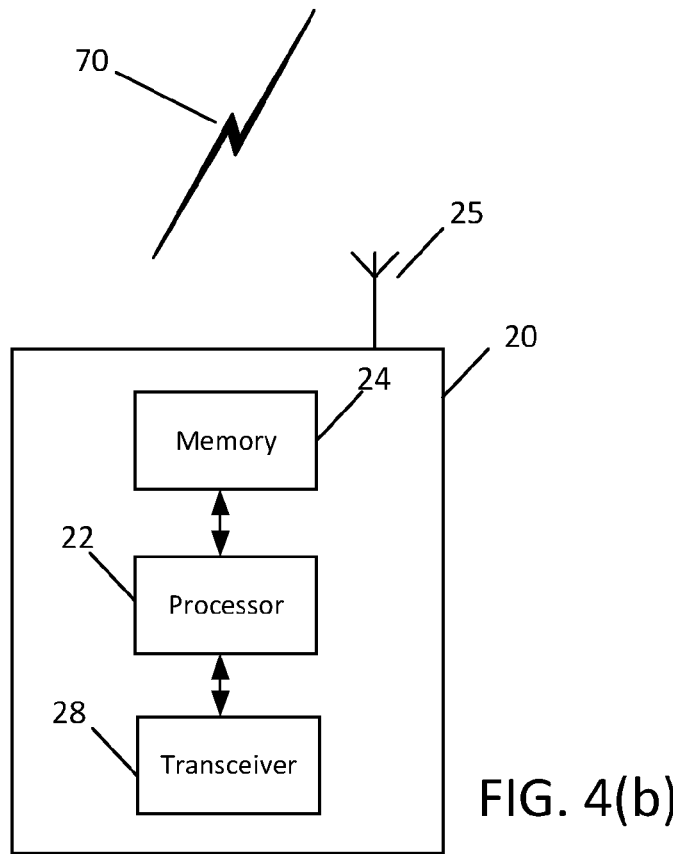

FIG. 4(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 4(b)

As illustrated in the example of FIG. 4(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4(b), multiple processors may be utilized according to other example embodiments. For example, it should be understood that, in certain example embodiments, apparatus may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods described herein.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus may be controlled by memory 24 and processor 22 to perform the functions associated with any of the embodiments described herein.

Further example embodiments may provide means for performing any of the functions, steps, or procedures described herein. For example one example embodiment may be directed to an apparatus that includes means for receiving a first indication in a downlink control information or a medium access control control element. The apparatus may further include means for determining whether to apply a multi-transmission reception point physical uplink shared channel scheme or a single-transmission reception point physical uplink shared channel scheme for transmitting a transport block based on the first indication. In addition, the apparatus may include means for interpreting at least one downlink control information field differently depending on whether it is determined that the applicable single-transmission reception point physical uplink shared channel scheme or the applicable multi-transmission reception point physical uplink shared channel dscheme.

Certain example embodiments described herein provide several technical improvements, enhancements, and/or advantages. In some example embodiments, it may be possible to provide solutions to enable a UE to dynamically determine whether to apply a multi-TRP PUSCH scheme or a single-TRP PUSCH scheme. It may also be possible to enable the UE to, for at least one DCI field, determine corresponding parameter value(s) depending on the applicable PUSCH scheme. In addition, it may be possible to provide an operation to determine the mapping/association between (i) some parameter(s) value(s) indicated via DCI and (ii) the configured SRS resource sets (and thus the TRPs) and/or the PUSCH repetitions. Such solutions and operation may be useful for a UE that has different types of services (e.g., URLLC and eMBB), and more generally, when both multi-TRP and single-TRP PUSCH schemes would need to be used for the UE.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G $5^{th}$ Generation
5GC 5G Core
CG Configured Grant
DCI Downlink Control Information
DL Downlink
DMRS Demodulation Reference Signal
eNB Enhanced Node B
gNB 5G or Next Generation NodeB
MAC CE Medium Access Control Element
NR New Radio
PDCCH Physical Downlink Control Channel
PDSCH Physical Downlink Shared Channel
PL RS Pathloss Reference Signal
PRI PUCCH Resource Index
PUCCH Physical Uplink Control Channel
PUSCH Physical Uplink Shared Channel
PTRS Phase-Tracking Reference Signal
RAN Radio Access Network
SRS Sounding Reference Signal
SRI SRS Resource Indicator
TCI Transmission Configuration Indicator
TDM Time Division Multiplexing
TDRA Time Domain Resource Assignment
TPMI Transmit Precoder Matrix Indicator
TRP Transmission and Reception Point
UE User Equipment
UL Uplink

We claim:
1. A method, comprising:
receiving, at a user equipment, a first indication in a downlink control information;
determining, based on the first indication, whether to apply a multi-transmission reception point physical uplink shared channel scheme or a single-transmission reception point physical uplink shared channel scheme;
interpreting at least one field of the downlink control information differently depending on whether it is determined that the single-transmission reception point physical uplink shared channel scheme or the multi- transmission reception point physical uplink shared channel scheme is applicable;

receiving, at the user equipment, a second indication, wherein the first indication and the second indication are received in a same field of the downlink control information, wherein when the single-transmission reception point physical uplink shared channel scheme is applicable, the second indication indicates a sounding reference signal resource set index, responsive to the second indication indicates the sounding reference signal resource set index, determining which sounding reference signal resource set to use based on the received second indication, and wherein when the multi-transmission reception point physical uplink shared channel scheme is applicable, the second indication indicates an order of sounding reference signal resource sets to use for physical uplink shared channel repetitions, responsive to the second indication indicates the order of sounding reference signal resource sets to use for physical uplink shared channel repetitions, determining the order of the sounding reference signal resource sets to use based on the received second indication.

2. The method according to claim 1, wherein when the multi-transmission reception point physical uplink shared channel scheme is applicable, the method further comprises:

determining, based on the received second indication, for mapping indicated values in the at least one field of the downlink control information to physical uplink shared channel repetitions, whether to start with a value corresponding to a first or a second sounding reference signal resource set.

3. The method according to claim 1, wherein when the single-transmission reception point physical uplink shared channel scheme is applicable, the at least one field of the downlink control information is interpreted by at least one of:

considering a subfield of the at least one field of the downlink control information, and determining a parameter value based on the subfield.

4. The method according to claim 3, wherein considering the subfield comprises at least one of:

when the at least one field of the downlink control information comprises a first sounding reference signal resource indicator field and a second sounding reference signal resource indicator field, the subfield is the first sounding reference signal resource indicator field or the second sounding reference signal resource indicator field;

when the at least one field of the downlink control information comprises a first precoding information and number of layers field and a second precoding information and number of layers field, the subfield is the first precoding information and number of layers field or the second precoding information and number of layers field;

when the at least one field of the downlink control information comprises a first transmit power control command field and a second transmit power control command field, the subfield is the first transmit power control command field or the second transmit power control command field;

when the at least one field of the downlink control information comprises a first phase tracking reference signal-demodulation reference signal association field and a second phase tracking reference signal-demodulation reference signal association field, the subfield is the first phase tracking reference signal-demodulation reference signal association field or the second phase tracking reference signal-demodulation reference signal association field;

when the at least one field of the downlink control information comprises a single phase tracking reference signal-demodulation reference signal association field, the subfield is a part of the phase tracking reference signal-demodulation reference signal association field.

5. The method according to claim 1, wherein the at least one field of the downlink control information comprises at least one of: a first sounding reference signal resource indicator field, a second sounding reference signal resource indicator field, a first precoding information and number of layers field, a second precoding information and number of layers field, a first transmit power control command field, a second transmit power control command field, a first phase tracking reference signal-demodulation reference signal association field, and a second phase tracking reference signal-demodulation reference signal association field.

6. An apparatus, comprising:

at least one processor; and at least one memory comprising computer program code, the at least one memory and the computer program code are configured, with the at least one processor, to cause the apparatus at least to:

receive a first indication in a downlink control information;

determine, based on the first indication, whether to apply a multi-transmission reception point physical uplink shared channel scheme or a single-transmission reception point physical uplink shared channel scheme; and interpret at least one field of the downlink control information differently depending on whether it is determined that the single-transmission reception point physical uplink shared channel scheme or the multi-transmission reception point physical uplink shared channel scheme is applicable;

receive a second indication, wherein the first indication and the second indication are received in a same field of the downlink control information, wherein when the single-transmission reception point physical uplink shared channel scheme is applicable, the second indication indicates a sounding reference signal resource set index, responsive to the second indication indicates the sounding reference signal resource set index, determine which sounding reference signal resource set to use based on the received second indication, and wherein when the multi-transmission reception point physical uplink shared channel scheme is applicable, the second indication indicates an order of sounding reference signal resource sets to use for physical uplink shared channel repetitions, responsive to the second indication indicates the order of sounding reference signal resource sets to use for physical uplink shared channel repetitions, determine the order of the sounding reference signal resource sets to use based on the received second indication.

7. The apparatus according to claim 6, wherein when the multi-transmission reception point physical uplink shared channel scheme is applicable, the apparatus is further caused to:

determine, based on the received second indication, for mapping indicated values in the at least one field of the downlink control information to physical uplink shared channel repetitions, whether to start with a value corresponding to a first or a second sounding reference signal resource set.

8. The apparatus according to claim 6, wherein when the single-transmission reception point physical uplink shared channel scheme is applicable, the at least one field of the downlink control information is interpreted by at least one of:
considering a subfield of the at least one field of the downlink control information, and determining a parameter value based on the subfield.

9. The apparatus according to claim 8, wherein
when the at least one field of the downlink control information comprises a first sounding reference signal resource indicator field and a second sounding reference signal resource indicator field, the subfield is the first sounding reference signal resource indicator field or the second sounding reference signal resource indicator field;
when the at least one field of the downlink control information comprises a first precoding information and number of layers field and a second precoding information and number of layers field, the subfield is the first precoding information and number of layers field or the second precoding information and number of layers field;
when the at least one field of the downlink control information comprises a first transmit power control command field and a second transmit power control command field, the subfield is the first transmit power control command field or the second transmit power control command field;
when the at least one field of the downlink control information comprises a first phase tracking reference signal-demodulation reference signal association field and a second phase tracking reference signal-demodulation reference signal association field, the subfield is the first phase tracking reference signal-demodulation reference signal association field or the second phase tracking reference signal-demodulation reference signal association field;
when the at least one field of the downlink control information comprises a single phase tracking reference signal-demodulation reference signal association field, the subfield is a part of the phase tracking reference signal-demodulation reference signal association field.

10. The apparatus according to claim 6, wherein when the multi-transmission reception point physical uplink shared channel scheme is applicable, the at least one field of the downlink control information is interpreted by at least one of:
considering the whole at least one downlink control information field, and determining two parameter values based on the whole at least one downlink control information field.

11. The apparatus according to claim 6, wherein the at least one field of the downlink control information comprises at least one of: a first sounding reference signal resource indicator field, a second sounding reference signal resource indicator field, a first precoding information and number of layers field, a second precoding information and number of layers field, a first transmit power control command field, a second transmit power control command field, a first phase tracking reference signal-demodulation reference signal association field, and a second phase tracking reference signal-demodulation reference signal association field.

12. An apparatus, comprising:
at least one processor; and
at least one memory comprising computer program code, the at least one memory and the computer program code are configured, with the at least one processor, to cause the apparatus at least to:
transmit, toward a user equipment, a first indication in a downlink control information;
wherein the first indication enables the user equipment to determine whether to apply a multi-transmission reception point physical uplink shared channel scheme or a single-transmission reception point physical uplink shared channel scheme;
wherein the first indication further enables the user equipment to interpret at least one field of the downlink control information differently depending on whether it is determined that the single-transmission reception point physical uplink shared channel scheme or the multi-transmission reception point physical uplink shared channel scheme is applicable;
transmit, toward the user equipment, a second indication, wherein the first indication and the second indication are transmitted in a same field of the downlink control information,
wherein when the single-transmission reception point physical uplink shared channel scheme is applicable, the second indication indicates to the user equipment a sounding reference signal resource set index,
wherein the second indication enables the user equipment to determine which sounding reference signal resource set to use based on the second indication, and
wherein when the multi-transmission reception point physical uplink shared channel scheme is applicable, the second indication indicates an order of sounding reference signal resource sets to use for physical uplink shared channel repetitions,
wherein the second indication enables the user equipment to determine the order of the sounding reference signal resource sets to use based on the second indication.

* * * * *